(12) United States Patent
Wu (10) Patent No.: US 7,048,296 B1
(45) Date of Patent: May 23, 2006

(54) LOWER CRADLE AND WHEEL BRACKET ARRANGEMENT FOR GOLF CART

(76) Inventor: David Wu, No. 35-1, Jih Hsin Street, Tu Cheng City, Taipei Hsien (TW)

( * ) Notice: Subject to any disclaimer, the term of this patent is extended or adjusted under 35 U.S.C. 154(b) by 142 days.

(21) Appl. No.: 10/863,219

(22) Filed: Jun. 9, 2004

(51) Int. Cl.
*B62B 3/12* (2006.01)

(52) U.S. Cl. .................. 280/651; 280/38; 280/43.1; 280/47.17; 280/47.2; 280/DIG. 6

(58) Field of Classification Search .............. 280/651, 280/47.24, 47.27, 43.1, 47.131, 47.17, 47.2, 280/47.26, 767, DIG. 6, 62, 38, 654
See application file for complete search history.

(56) References Cited

U.S. PATENT DOCUMENTS

| 4,289,324 | A | * | 9/1981 | Nemeth | 280/38 |
| 6,017,051 | A | * | 1/2000 | Thimmig | 280/642 |
| 6,120,053 | A | * | 9/2000 | DeAngelis | 280/641 |
| 2001/0033070 | A1 | * | 10/2001 | Reimers et al. | 280/651 |

* cited by examiner

*Primary Examiner*—Christopher P. Ellis
*Assistant Examiner*—John Walters
(74) *Attorney, Agent, or Firm*—Troxell Law Office, PLLC (57) ABSTRACT

A lower cradle and wheel bracket arrangement for golf cart is constructed to include a cradle body, a support member pivoted to the cradle body, a wheel bracket pivoted to the support member and holding a front wheel, a first lock adapted to lock the support member to the cradle body, and a second lock adapted to lock the wheel bracket to the support member.

2 Claims, 9 Drawing Sheets

LOWER CRADLE AND WHEEL BRACKET ARRANGEMENT FOR GOLF CART

BACKGROUND AND SUMMARY OF THE INVENTION

The present invention relates to a golf cart and more particularly, to a lower cradle and wheel bracket arrangement for golf cart, which enables the wheel bracket and the wheel to be received in a received position when the golf cart is not in use.

Figure 1:
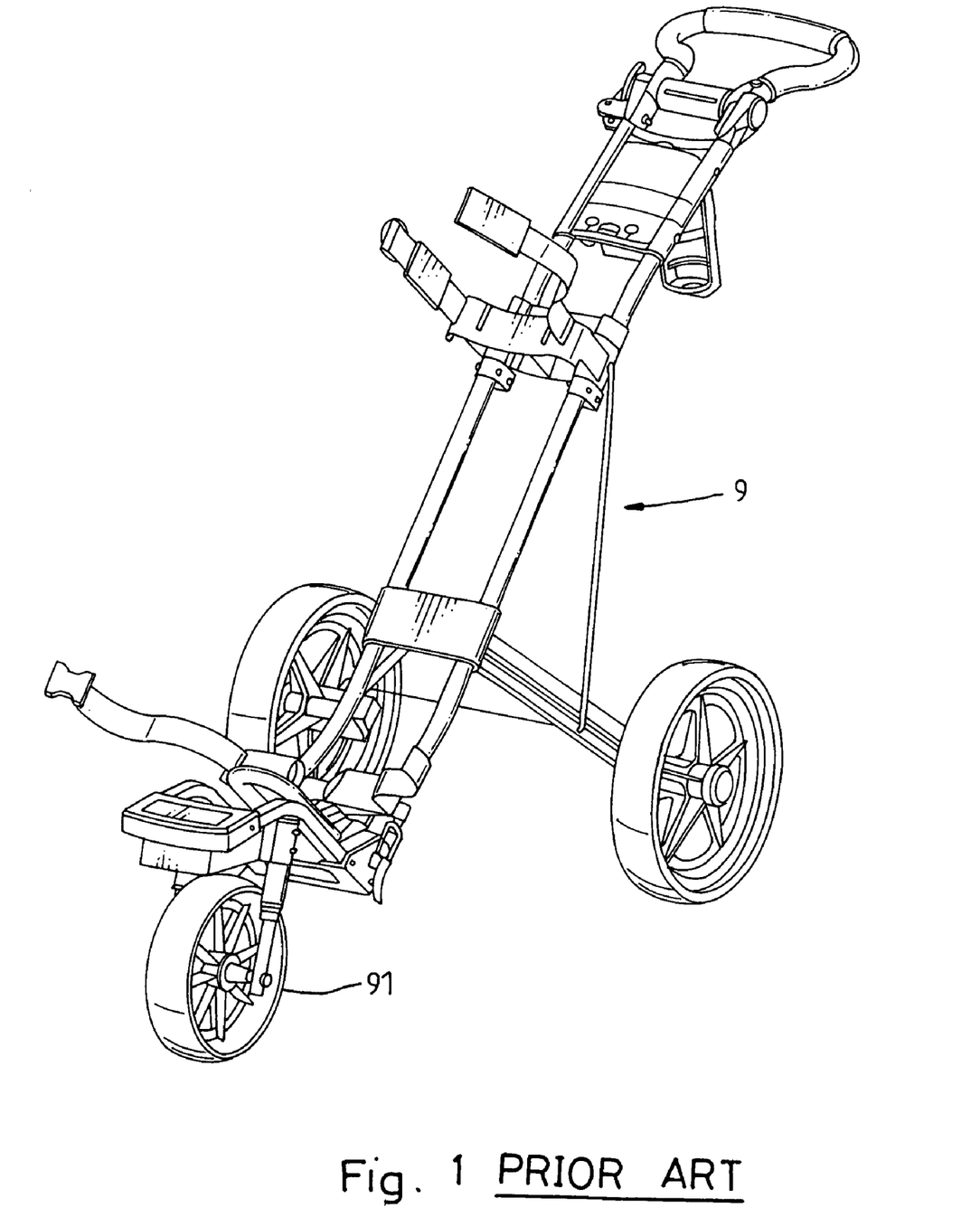
FIG. 1 is an elevational view of a golf cart constructed according to the prior art.
Figure 2:
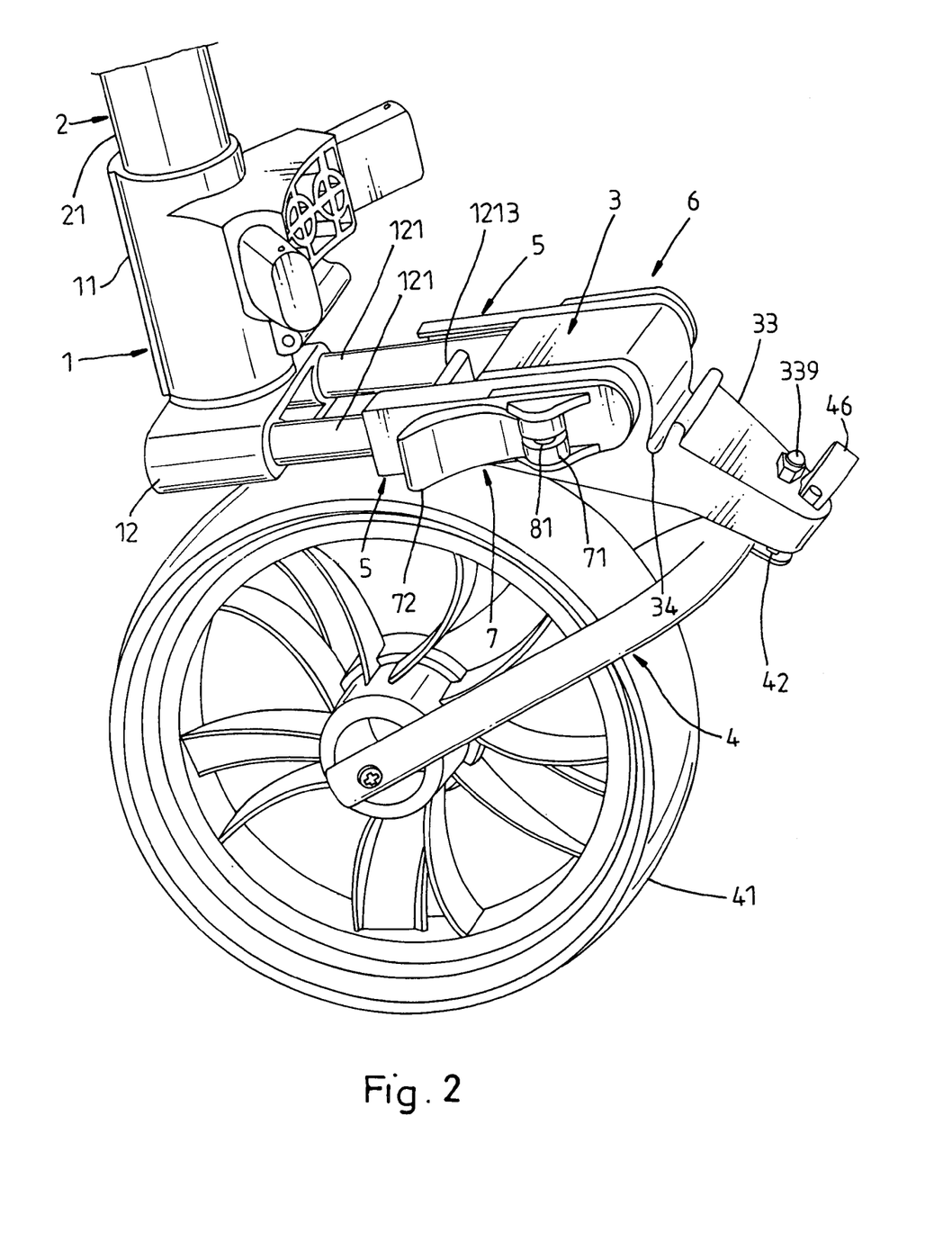
FIG. 2 is an elevational view of a golf cart constructed according to the present invention.

A golf cart without a front wheel is not easy to move. In order to eliminate this drawback, golf cart with a front wheel is developed. FIG. 1 shows a golf cart 9 having a front wheel 91 at the bottom side of the lower golf bag cradle. Because the wheel bracket, which holds the front wheel, is fixedly fastened to the lower golf bag cradle and not collapsible, it greatly increases space occupation of the golf cart when the golf cart is not in use.

The present invention has been accomplished under the circumstances in view. It is therefore the main object of the present invention to provide a lower cradle and wheel bracket arrangement for golf cart, which is collapsible to reduce space occupation of the golf cart when the golf cart is not in use. According to one aspect of the present invention, the lower cradle and wheel bracket arrangement comprises a cradle body, a support member pivoted to the cradle body, a wheel bracket pivoted to the support member and holding a front wheel, and a locking mechanism adapted to lock the support member to the cradle body. When unlocked the locking mechanism, the wheel bracket can be turned with the support member to a receiving position and then locked in the received position to reduce space occupation. According to another aspect of the present invention, a second locking mechanism is provided for locking the wheel bracket to the support member. When locked the second locking mechanism, the wheel bracket can be turned relative to the support member to adjust the angular position.

DETAILED DESCRIPTION OF THE INVENTION

Referring to FIGS. 2~6, a lower cradle and wheel bracket arrangement in accordance with the present invention is shown comprised of a cradle body 1, a support member 3, a wheel bracket 4, two ornamental covers 5, two side covers 6, two spring members 60, a locking lever 7, and a pivot shaft 8.

Figure 3:
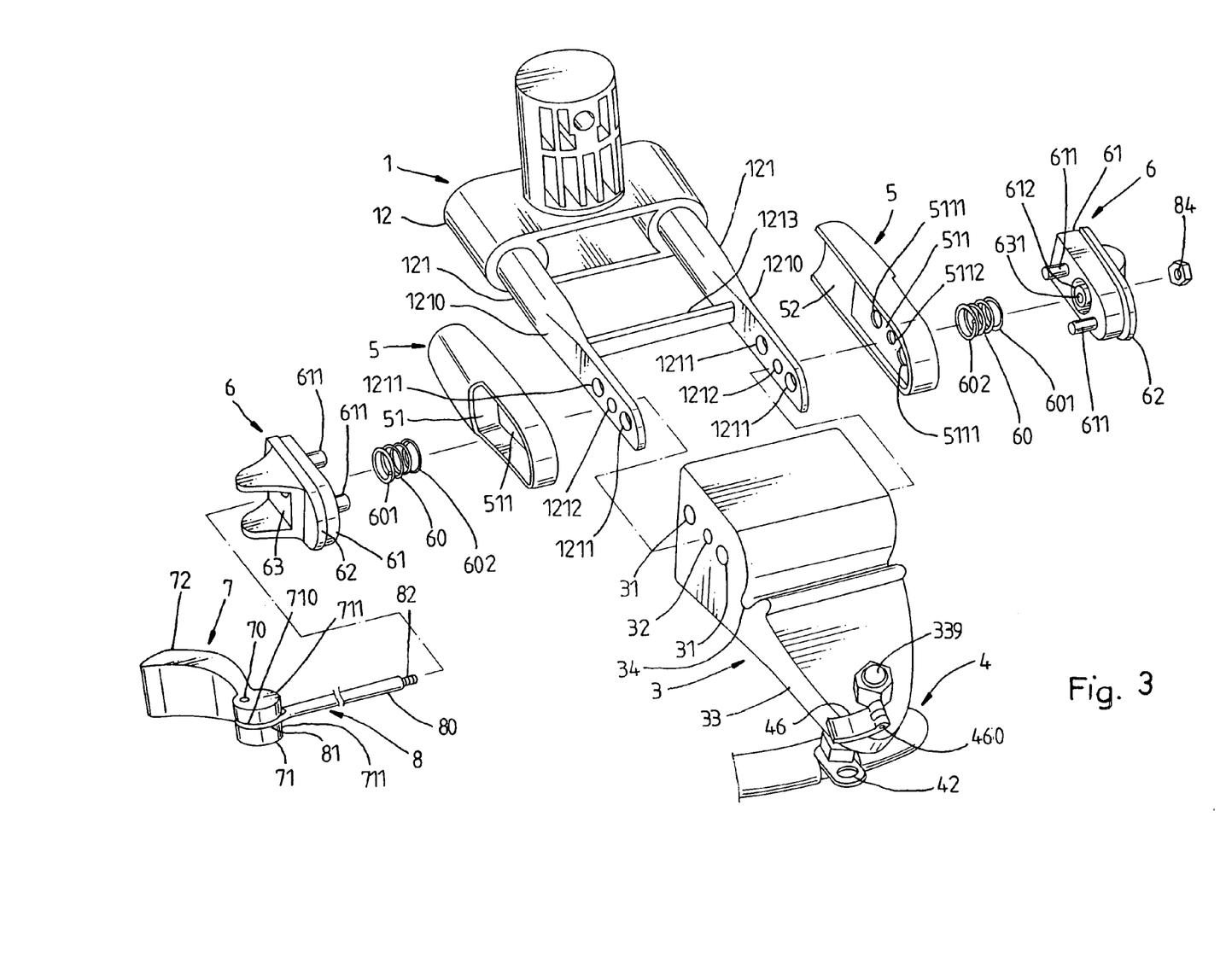
FIG. 3 is an exploded view of the preferred embodiment of the present invention.

The cradle body 1 comprises a hollow coupling block 11 fixedly fastened to the rear end 21 of the golf cart's main rod member 2 with fastening devices, for example, screws (not shown), a holder block 12 fixedly fastened to the rear side of the coupling block 11, two mounting rods 121 respectively extended from the holder block 12 in direction perpendicular to the coupling block 11 and the main rod member 2 and arranged in parallel, and a transverse locating bar 1213 connected between the mounting rods 121. The mounting rods 121 each have two insertion holes 1211 and a pivot hole 1212 equally spaced between the insertion holes 1211.

The support member 3 is mounted on the mounting rods 121 of the cradle body 1, comprising two pairs of insertion holes 31 symmetrically formed in two opposite sidewalls thereof corresponding to the insertion holes 1211 in the mounting rods 121 of the cradle body 1, two pivot holes 32 corresponding to the pivot holes 1212 in the mounting rods 121 of the cradle body 1, a mounting flange 33 pivotally fastened to the wheel bracket 4 with a pivot member, for example, a screw bolt 339, and a locating groove 34 transversely situated at the top wall thereof on the middle for engagement with the transverse locating bar 1213.

The wheel bracket 4 is pivotally connected to the mounting flange 33 of the support member 3 and holding a front wheel 41.

Figure 4:
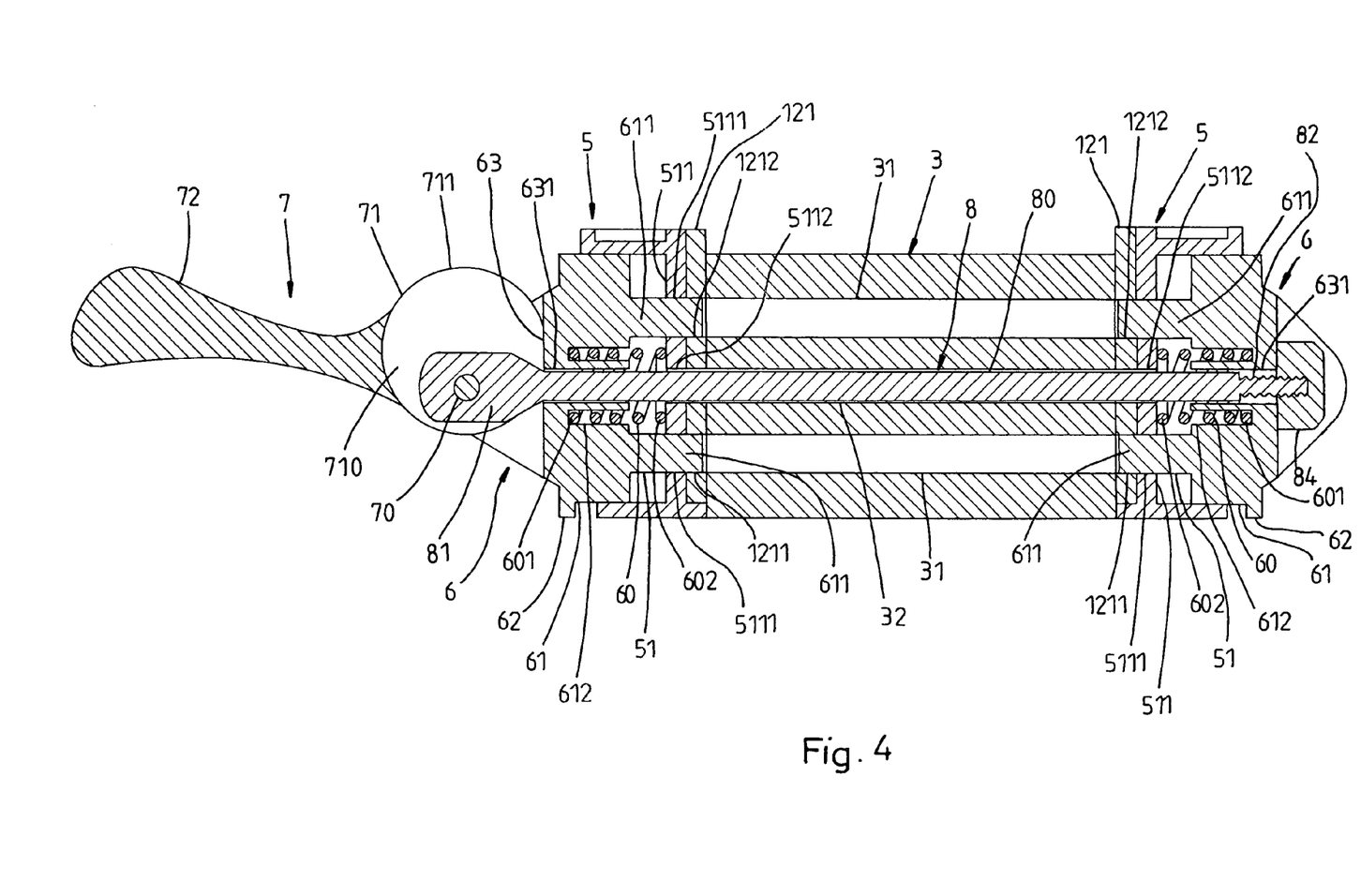
FIG. 4 is a sectional assembly view in an enlarged scale of a part of the preferred embodiment of the present invention, showing the locking lever turned to the unlocking position.
Figure 5:
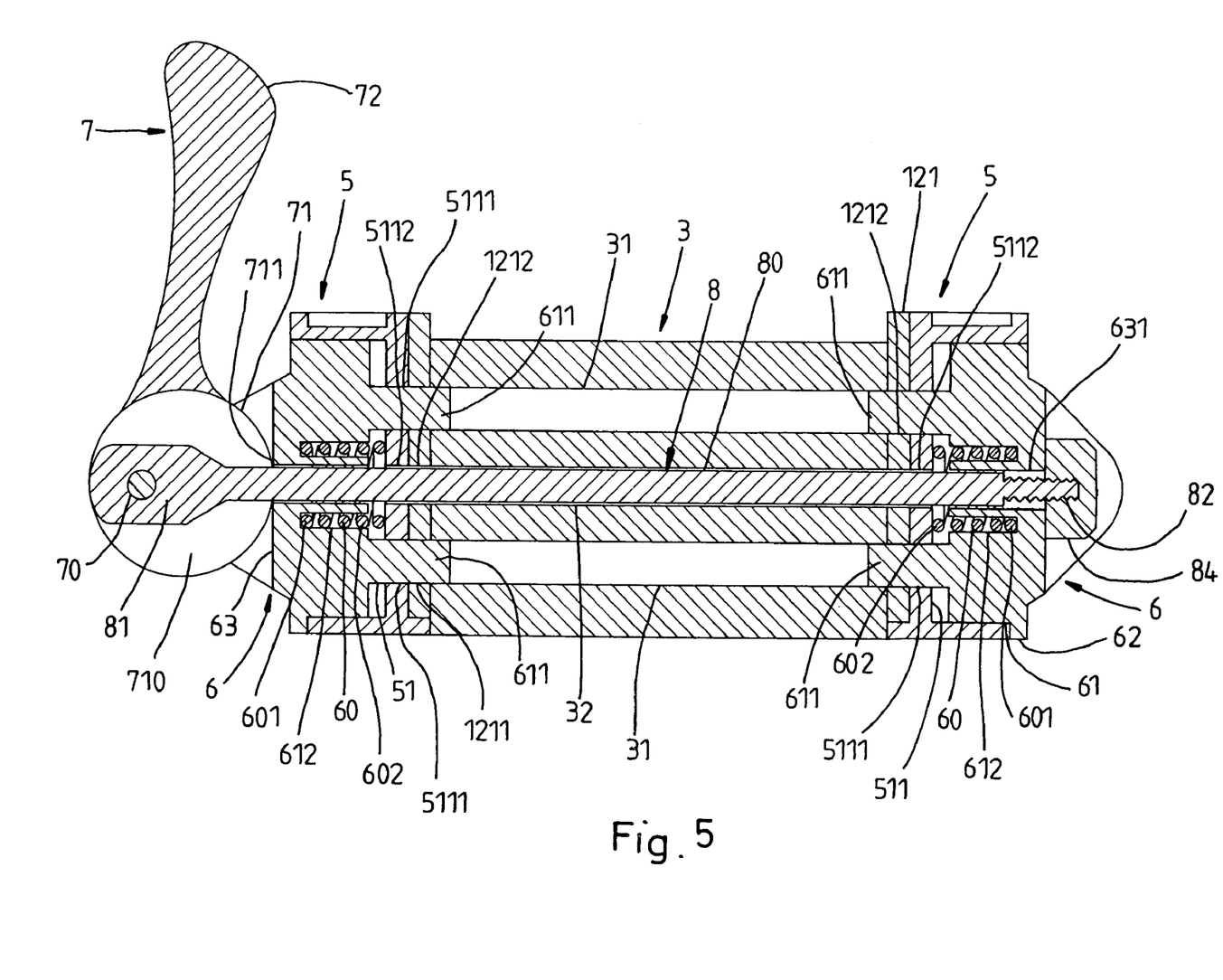
FIG. 5 is similar to FIG. 4 but showing the locking lever turned to the locking position.

The ornamental covers 5 are respectively covered on the two opposite sidewalls of the support member 3, each comprising a receiving open chamber 51, two insertion holes 5111 through the bottom wall 511 of the receiving open chamber 51 corresponding to the insertion holes 1211 in the corresponding mounting rod 121 of the cradle body 1, a through hole 5112 spaced between the insertion holes 1211 corresponding to the pivot hole 1212 in the corresponding mounting rod 121 of the cradle body 1, and a bearing surface portion 52 supported on a sloping surface portion 1210 of the corresponding mounting rod 121 of the cradle body 1 (see FIGS. 4 and 5).

The two side covers 6 are respectively movably coupled to the ornamental covers 5, each comprising a base 61, two locating rods 611 perpendicularly extended from one side, namely, the inner side of the base 61 and adapted to engage the insertion holes 5111 of the corresponding ornamental cover 5 and the insertion holes 1211 of the corresponding mounting rod 121 of the cradle body 1 and the insertion holes 31 in one sidewall of the support member 3, a locating groove 612 spaced between the locating rods 611, a flange 62 situated at the other side, namely, the outer side of the base 61, a bearing portion 63 formed integral with the flange 62, and a through hole 631 through the center of the bearing portion 63 and the center of the locating groove 612.

The locking lever 7 has one end terminating in a grip 72 and the other end terminating in a cam 71. The cam 71 is kept in contact with the bearing portion 63 of one side cover 6, having a coupling hole 710 and a smoothly curved protruding peripheral wall portion 711.

The pivot shaft 8 comprises a shaft body 80 inserted in proper order through the through holes 631 of the side covers 6, the through holes 5112 of the ornamental covers 5, the pivot holes 32 of the support member 3 and the pivot holes 1212 of the mounting rods 121, a head 81 provided at one end of the shaft body 80 and pivotally coupled to the coupling hole 710 of the cam 71 of the locking lever 7 by a pivot pin 70, and a screw rod 82 extended from the other end of the shaft body 80 and screwed up with a cap nut 84.

The spring members 60 are respectively mounted on the shaft body 80 of the pivot shaft 8 and supported between the ornamental covers 5 and the side covers 6, each having a first end 601 positioned in the locating groove 612 of the corresponding side cover 6 and a second end 602 supported on the bottom wall 511 of the receiving open chamber 51 of the corresponding ornamental cover 5.

Figure 6:
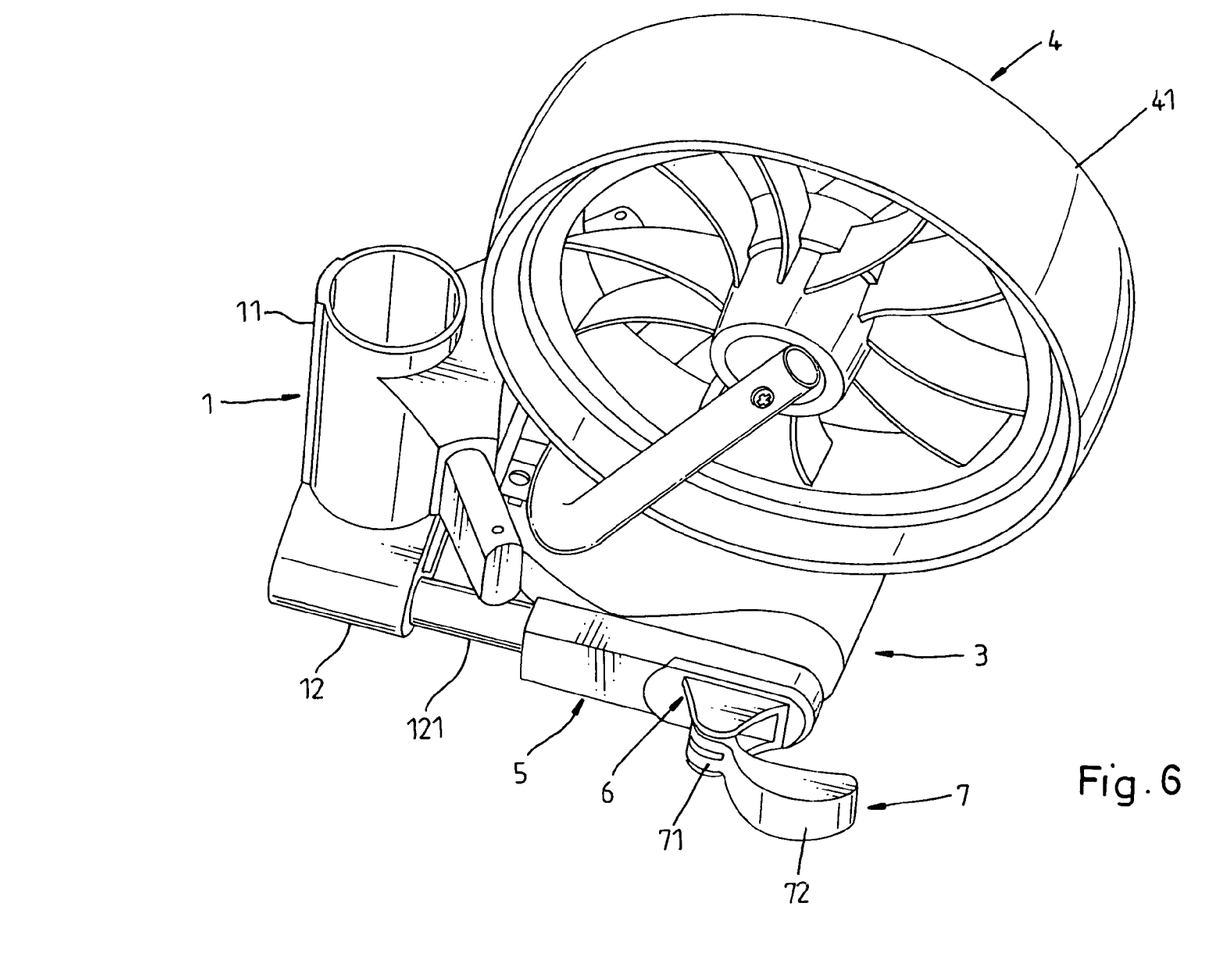
FIG. 6 shows the received status of the support member, the wheel bracket and the wheel according to the present invention.

Normally, the smoothly curved protruding peripheral wall portion 711 is maintained in contact with the bearing portion 63 of the corresponding side cover 6 to force the side covers 6 toward the ornamental covers 5, therefore the locating rods 611 of the side covers 6 are respectively engaged into the insertion holes 5111 of the ornamental covers 5 and the insertion holes 1211 of the mounting rods 121 of the cradle body 1 and the insertion holes 31 of the support member 3 to lock the support member 3 to the cradle body 1. When not in use, the locking lever 7 is turned relative to the corresponding side cover 6 to move the smoothly curved protruding peripheral wall portion 711 away from the bearing portion 63 of the corresponding side cover 6 to release the spring members 60, at this time the spring members 60 push the side covers 6 outwards from the ornamental covers 5 to disengage the locating rods 611 from the insertion holes 31 of the support member 3, and therefore the support member 3 is unlocked from the cradle body 1 and can be turned about the pivot shaft 8 relative to the cradle body 1 to force the locating groove 34 into engagement with the transverse locating bar 1213 and to receive the wheel bracket 4 and the front wheel 41 in the non-operative position.

Figure 7:
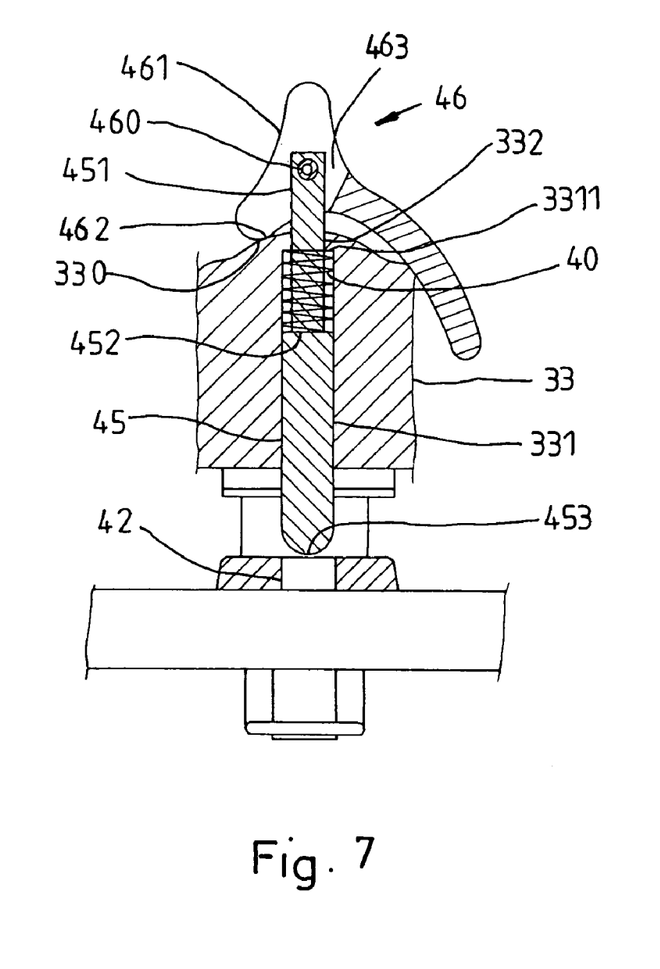
FIG. 7 is a sectional view in an enlarged scale of a part of the preferred embodiment of the present invention, showing the locking rod turned to the first position and the locking rod disengaged from the lock hole of the wheel bracket.
Figure 8:
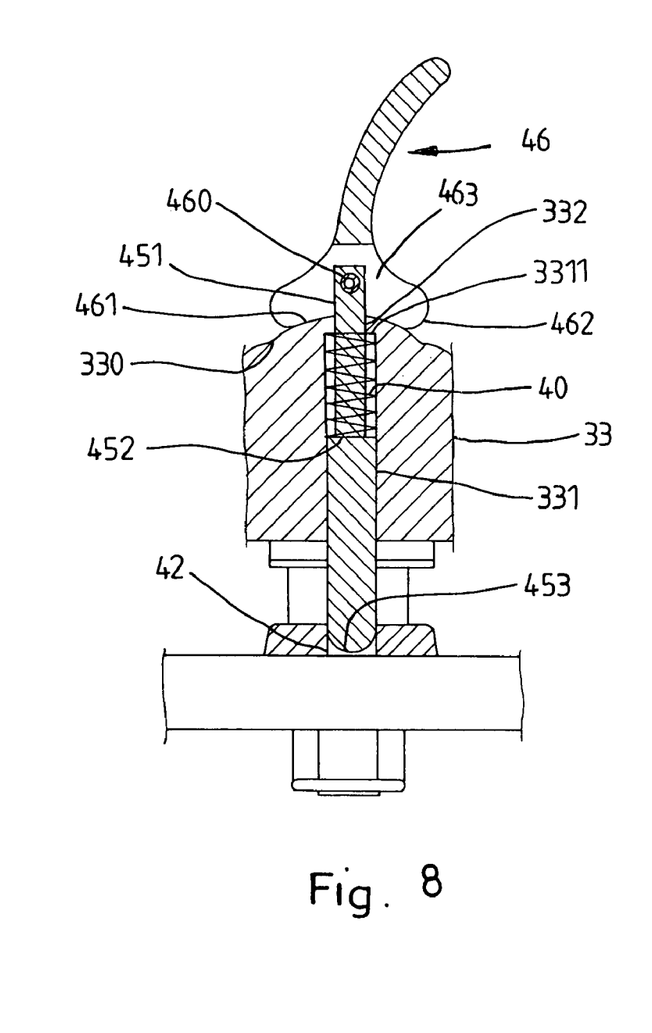
FIG. 8 is similar to FIG. 7 but showing the handle turned to the second position and the locking rod engaged into the lock hole of the wheel bracket.
Figure 9:
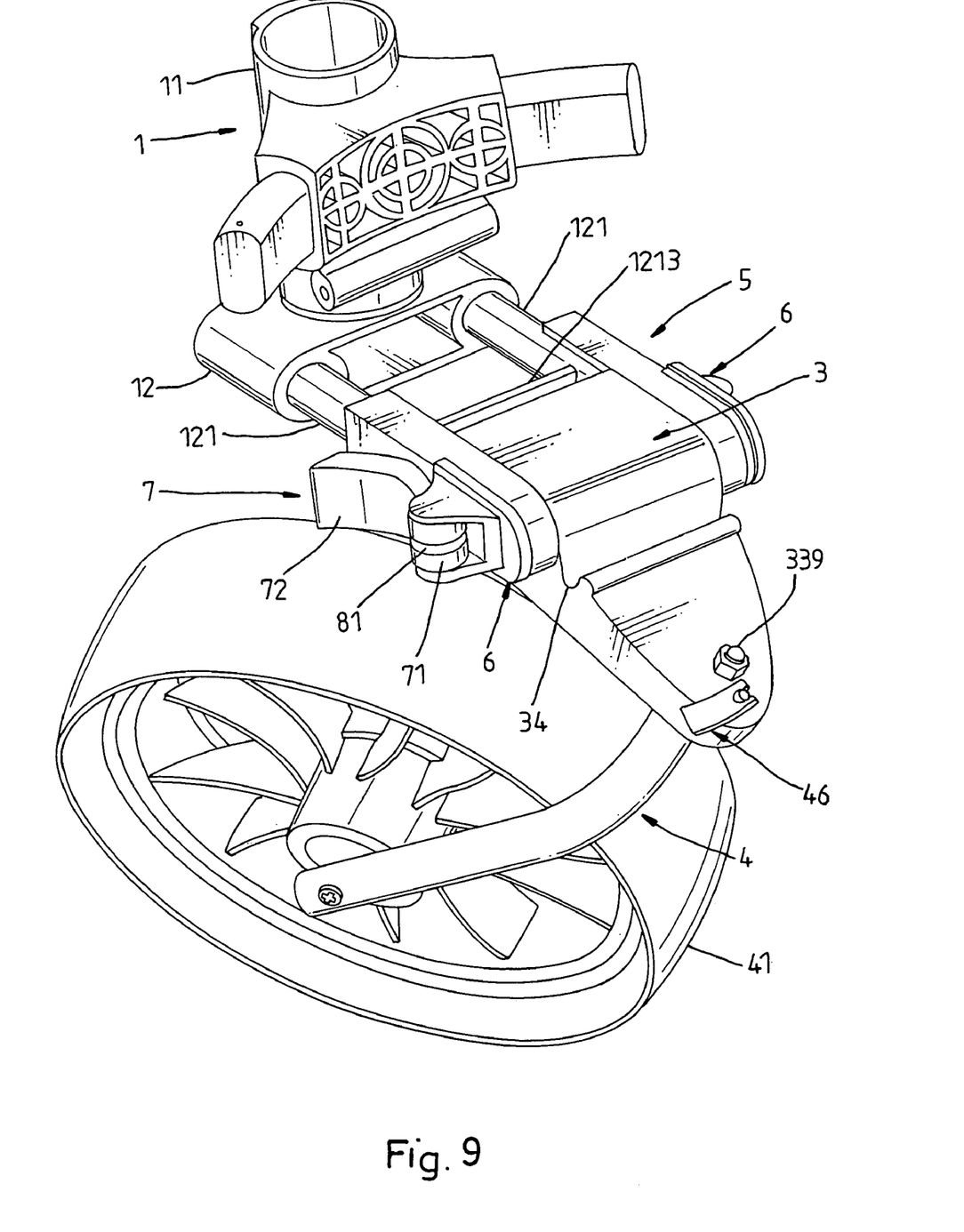
FIG. 9 is a perspective view showing the wheel bracket turned.

Referring to FIGS. 7~9 and FIG. 3 again, the wheel bracket 4 has a lock hole 42 in the top side. The flange 33 of the support member 3 has a sliding slot 331 and an axle hole 332 axially connected in a line and extended through the top and bottom sides, and an inside step 3311 between the axle hole 332 and the sliding slot 331. The sliding slot 331 has a diameter greater than the axle hole 332. A locking rod 45 is inserted through the sliding slot 331, having an extension stem 451 axially extended the top end 452 thereof and inserted through the axle hole 332 to the outside of the flange 33 of the support member 3. A handle 46 is pivotally connected to the distal end of the extension stem 451 remote from the locking rod 45 by a pivot pin 460, having a first stop wall portion 461 and a second stop wall portion 462. A spring member, for example, a compression spring 40 is mounted on the stem 451 and stopped between the top end 452 of the locking rod 45 and the inside step 3311 of the flange 33. The handle 46 can be turned about the pivot pin 460 relative to the locking rod 45 between a first position where the first stop wall portion 461 is stopped against a top bearing wall portion 330 of the flange 33 and the bottom end 453 of the locking rod 45 is engaged into the lock hole 42 of the wheel bracket 4 to stop the wheel bracket 4 from rotary motion relative to the support member 3 (see FIG. 7), and a second position where the second stop wall portion 462 is stopped against the top bearing wall portion 330 of the flange 33 and the bottom end 453 of the locking rod 45 is disengaged from the lock hole 42 of the wheel bracket 4, allowing the wheel bracket 4 to be turned about the screw bolt 339 (see FIGS. 8 and 9). Further, the handle 46 has an opening 463, which prevents interference of the extension stem 451 with the turning action of the handle 46.

As indicated above, the invention achieves the following advantages:

1. Normally, the locating rods 611 of the side covers 6 are respectively engaged into the insertion holes 31 of the support member 3 to lock the support member 3 to the cradle body 1. When not in use, the locking ever 7 is turned relative to the corresponding side cover 6 to disengage the locating rods 611 from the insertion holes 31 of the support member 3, allowing the wheel bracket 4 and the front wheel 41 to be turned with the support member 3 relative to the cradle body 1 to the received position to force the locating groove 34 into engagement with the transverse locating bar 1213.

2. The handle 46 can be turned to disengage the locking rod 45 from the lock hole 42 of the wheel bracket 4, allowing the wheel bracket 4 to be turned about the screw bolt 339 to the desired angle.

3. The user can unfasten the screw bolt 339 to remove the wheel bracket 4 and the front wheel 41 from the support member 4, and therefore the golf cart can be used without a front wheel.

The invention claimed is:

1. A lower cradle and wheel bracket arrangement comprising:

a cradle body, said cradle body comprising a hollow coupling block fixedly fastened to the rear end of a main rod member for golf cart, a holder block fixedly fastened to a rear side of said coupling block, two mounting rods respectively extended from said holder block in direction perpendicular to said coupling block and said main rod member and arranged in parallel, and a transverse locating bar connected between said mounting rods, said mounting rods each having two insertion holes and a pivot hole equally spaced between the insertion holes;

a support member mounted on said mounting rods of said cradle body, said support member comprising two pairs of insertion holes symmetrically formed in two opposite sidewalls thereof corresponding to the insertion holes in the mounting rods of said cradle body, two pivot holes corresponding to the pivot holes in the mounting rods of said cradle body, a mounting flange, and a locating groove transversely situated at a top wall thereof for engagement with said transverse locating bar;

a wheel bracket pivotally connected to said mounting flange of said support member by a pivot, said wheel bracket holding a front wheel;

two ornamental covers respectively covered on the two opposite sidewalls of said support member, said ornamental covers each comprising a receiving open chamber, two insertion holes extended through said receiving open chamber corresponding to the insertion holes in the mounting rods of said cradle body, and a through hole corresponding to the pivot holes in the mounting rods of said cradle body;

two side covers respectively movably coupled to said ornamental covers, said side covers each comprising a base receivable in the receiving open chamber of one said ornamental cover, two locating rods perpendicularly extended from an inner side of said base and adapted to engage the insertion holes of said ornamental covers and the insertion holes of the mounting rods of said cradle body and the insertion holes of said support member, a locating groove spaced between the locating rods of the respective side cover, a bearing portion disposed at an outer side, and a through hole extended through the center of the bearing portion and the center of the locating groove of the respective side cover;

a locking lever, said locating lever having a grip at one end thereof and a cam at an opposite end thereof, said cam being disposed in contact with the bearing portion of one said side cover, said cam having a coupling hole and a smoothly curved protruding peripheral wall portion;

a pivot shaft inserted through the through holes of said side covers, the through holes of said ornamental covers, the pivot holes of said support member and the pivot holes of the mounting rods of said cradle body, said pivot shaft having a first end extended out of one of said two side covers and pivotally coupled to the coupling hole of said cam of said locking lever by a pivot pin and a second end extended out of the other of said two side covers and fastened with a fastening element that secures said pivot shaft to said cradle body, said support member, said ornamental covers and said side covers and allows said pivot shaft to be moved axially in the through holes of said side covers, the through holes of said ornamental covers, the pivot holes of said support member and the pivot holes of the mounting rods of said cradle body; and two spring members respectively mounted on said pivot shaft and supported between said ornamental covers and said side covers and adapted to push said side covers outwards from said ornamental covers, said spring members each having a first end positioned in the locating groove of one said side cover and a second end supported on one said ornamental cover;

wherein said locking lever is turnable relative to the respective side cover between a first position where said smoothly curved protruding peripheral wall portion is stopped against the bearing portion of the respective side cover to force said side covers toward each other and therefore the locating rods of said side covers are respectively engaged into the insertion holes of said support member to lock said support member to said cradle body, and a second position where said smoothly curved protruding peripheral wall portion is moved away from the bearing portion of the respective side cover to release said side covers and therefore said spring members push said side covers outwards from said ornamental covers to disengage said locating rods from the insertion holes of said support member, for enabling said support member to be turned about said pivot shaft elative to said cradle body to force said locating groove into engagement with said transverse locating bar.

2. The lower cradle and wheel bracket as claimed in claim 1, where said wheel bracket has a lock hole in a top side thereof; said flange of said support member has a top bearing wall portion; said support member further comprises a stepped through hole extended through top and bottom sides of the flange of said support member, a stepped locking rod inserted through said stepped through hole and adapted to engage the lock hole of said wheel bracket and to lock said wheel bracket to said support, a spring member mounted inside said stepped through hole and adapted to force said stepped locking rod into engagement with the lock hole of said wheel bracket, and a handle pivoted to one end of said stepped locking rod and adapted to selectively to move said locking rod in and out of said lock hole of said wheel bracket, said handle having a first stop wall portion, a second stop wall portion, and an opening corresponding to said stepped locking rod, said handle being turnable relative to said locking rod between a first position where said first stop wall portion is stopped against the top bearing wall portion of the flange of said support member and said locking rod is engaged into the lock hole of said wheel bracket to stop said wheel bracket from rotary motion relative to said support member, and a second position where said second stop wall portion is stopped against the top bearing wall portion of the flange of said support member and said locking rod is disengaged from the lock hole of said wheel bracket, allowing said wheel bracket to be turned relative to said support member.

* * * * *